(12) United States Patent
Granderath

(10) Patent No.: US 6,776,272 B2
(45) Date of Patent: Aug. 17, 2004

(54) FRICTION CLUTCH, ESPECIALLY A TORQUE CONVERTER LOCKUP CLUTCH FOR A HYDRODYNAMIC TORQUE CONVERTER

(75) Inventor: Paul Granderath, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/204,886

(22) PCT Filed: Feb. 17, 2001

(86) PCT No.: PCT/EP01/01768
§ 371 (c)(1),
(2), (4) Date: Aug. 22, 2002

(87) PCT Pub. No.: WO01/63149
PCT Pub. Date: Aug. 30, 2001

(65) Prior Publication Data
US 2003/0010589 A1 Jan. 16, 2003

(30) Foreign Application Priority Data
Feb. 23, 2000 (DE) .......................... 100 08 167

(51) Int. Cl.⁷ .............................................. F16H 45/02
(52) U.S. Cl. ................................. 192/3.29; 192/113.36
(58) Field of Search ........................... 192/3.28, 3.29, 192/3.3, 70.12, 107 R, 113.36

(56) References Cited

U.S. PATENT DOCUMENTS

| | | | |
|---|---|---|---|
| 2,163,884 A | 6/1939 | La Brie | 188/140 |
| 3,972,400 A | 8/1976 | Howells | 192/107 R |
| 4,986,397 A | 1/1991 | Vierk | 192/3.3 |
| 5,248,016 A | 9/1993 | Umezawa | 192/3.28 |
| 5,335,765 A | 8/1994 | Takakura et al. | 192/107 R |
| 5,348,127 A | 9/1994 | Murata et al. | 192/3.3 |
| 5,501,309 A * | 3/1996 | Walth et al. | 192/3.29 |
| 5,566,802 A | 10/1996 | Kirkwood | 192/3.29 |
| 5,669,474 A | 9/1997 | Dehrmann et al. | 192/3.29 |
| 5,759,131 A | 6/1998 | Kosik et al. | 477/84 |
| 5,782,327 A | 7/1998 | Otto et al. | 192/3.29 |
| 5,921,366 A * | 7/1999 | Walth et al. | 192/113.36 |
| 5,979,621 A | 11/1999 | Schoder | 192/3.29 |
| 6,033,340 A | 3/2000 | Amendt et al. | 477/77 |
| 6,035,992 A | 3/2000 | Menard et al. | 192/107 M |
| 6,105,709 A | 8/2000 | Eckstein et al. | 180/333 |
| 6,113,515 A | 9/2000 | Salecker et al. | 477/72 |
| 6,302,823 B1 | 10/2001 | Eckert et al. | 477/186 |

FOREIGN PATENT DOCUMENTS

| | | | |
|---|---|---|---|
| DE | 32 43 461 A1 | 7/1983 | B60K/41/06 |
| DE | 33 34 723 A1 | 4/1985 | B60K/41/02 |
| DE | 34 21 387 A1 | 12/1985 | B60K/41/02 |
| DE | 37 24 070 A1 | 2/1989 | B60K/41/00 |
| DE | 40 02 328 A1 | 8/1990 | H03K/17/28 |
| DE | 43 02 773 A1 | 8/1993 | F16D/13/64 |
| DE | 44 20 959 A1 | 1/1995 | F16H/45/02 |
| DE | 44 25 912 A1 | 2/1995 | F16H/45/02 |
| DE | 44 32 624 C1 | 4/1996 | F16H/45/02 |

(List continued on next page.)

*Primary Examiner*—Richard M. Lorence
(74) *Attorney, Agent, or Firm*—Davis & Bujold P.L.L.C.

(57) ABSTRACT

A slipping friction clutch which has at least on a pair of wet-running friction areas, especially a slipping converter bridging clutch for the hydrodynamic torque of a motor vehicle automatic transmission. In the state under the action of pressure, the two friction areas seal off the radially outward lying high pressure chamber against the radially inward lying lower pressure chamber, whereby at least one of the friction areas has oil-conducting depressions whose ends spaced from one another are directly hydraulically connected with the one of the two pressure chambers and which are configured such that, with a slipping friction coupling, the friction area sliding peripherally exerts a drag action owing to which an oil through flow is induced as a function of the slippage rotational speed which cools the friction area.

20 Claims, 4 Drawing Sheets

FOREIGN PATENT DOCUMENTS

| | | | |
|---|---|---|---|
| DE | 195 27 853 C1 | 12/1996 | ........... F16H/45/02 |
| DE | 196 26 685 A1 | 1/1997 | ........... F16H/45/02 |
| DE | 195 30 613 A1 | 2/1997 | ........... F16D/48/02 |
| DE | 196 22 593 A1 | 4/1997 | ........... F16H/45/02 |
| DE | 196 25 502 C1 | 11/1997 | ........... B60K/26/02 |
| DE | 197 16 828 A1 | 11/1997 | ........... B60K/23/00 |
| DE | 197 21 034 A1 | 11/1997 | ........... B60K/41/02 |
| DE | 197 22 151 A1 | 12/1997 | ........... F16H/45/00 |
| DE | 197 34 678 A1 | 2/1998 | ........... F16H/45/02 |
| DE | 197 14 563 C1 | 8/1998 | ........... F16H/45/02 |
| DE | 29521915 U1 | 11/1998 | ........... F16H/45/02 |
| DE | 43 02 773 C2 | 12/1998 | ........... F16D/13/64 |
| DE | 197 53 764 A1 | 6/1999 | ........... B60K/41/00 |
| DE | 198 13 055 A1 | 9/1999 | ........... F16H/45/02 |
| DE | 199 09 349 A1 | 9/1999 | ........... F16H/45/02 |
| DE | 196 22 593 C2 | 2/2000 | ........... F16H/45/02 |
| DE | 100 09 576 A1 | 2/2001 | ........... F16H/45/02 |
| EP | 0078651 A2 | 5/1983 | |
| EP | 0 428 248 B1 | 5/1991 | ........... F16H/45/02 |
| EP | 0 731 294 A2 | 9/1996 | ........... F16H/59/14 |
| EP | 0 819 863 A1 | 1/1998 | ........... F16D/13/72 |
| EP | 0 874 180 A1 | 10/1998 | ........... F16H/45/02 |
| FR | 2 764 560 A1 | 12/1998 | ........... B60K/23/02 |
| GB | 2 273 534 A | 6/1994 | ........... F16H/45/02 |
| JP | 62-71728 A | 4/1987 | ........... B60K/41/02 |
| JP | 07 145858 A | 6/1995 | |
| JP | 2000 329212 A | 11/2000 | |

* cited by examiner

FRICTION CLUTCH, ESPECIALLY A TORQUE CONVERTER LOCKUP CLUTCH FOR A HYDRODYNAMIC TORQUE CONVERTER

FIELD OF THE INVENTION

The invention concerns a slipping friction clutch which has at least one pair of wet-running friction areas and especially has a slipping converter bridging clutch for the hydraulic torque converter of a motor vehicle automatic transmission.

BACKGROUND OF THE INVENTION

Hydrodynamic torque converters with a converter bridging clutch for an automatic transmissions of motor vehicles are known in many ways. Thus DE A 199 09 349 describes a hydrodynamic torque converter of this type, which has a pump impeller that is connected from the drive-side through a converter housing with a drive shaft, a turbine wheel can be connected with a drive shaft and a guide wheel, whereby the wheels together form a converter circuit filled with hydraulic fluid. A converter bridging clutch which has an annular disk-like bridging subassembly pressing on an interior wall of the converter housing by means of hydraulic pressure arranged between the converter housing and the turbine wheel is provided in the torque converter, as is a space constructed between the converter bridging clutch and the converter housing which is connected with an axial borehole of the output shaft whereby a connection for a converter circuit is provided on the side of the converter bridging clutch facing away from the converter housing.

These hydrodynamic torque converters find a wide use in motor vehicles and in particular in passenger vehicles for reasons of comfort. In order to avoid energy losses during an operating phases which require no shifting of a gearbox connected with the torque converter that are conditioned by the slippage between the pump impeller and the turbine wheel, these torque converters are provided with the bridging clutch. The bridging subassembly of this bridging clutch, acting as a piston in a certain way, directly takes over the transmission of torque between the converter housing and the output shaft in the state where it is pressed on the converter housing. Moreover, the friction area between the bridging subassembly and the converter housing is cooled by the hydraulic fluid flow which, for example, flows through intermediate spaces between the converter housing and the bridging subassembly pressed onto the converter housing into the space between the bridging subassembly and the converter housing, and from there into an axial bore hole of the output shaft.

Operating converter bridging clutches with slippage is known, whereby this slippage can arise, according to the design of the power train and/or as a function of the gear steps fed in and/or as a function of the operating state of the drive interacting with the flow converter either for a short time, for example during shifting processes, or as a continuous slippage through the entire operating range of the flow converter. During the slippage phase, a power loss in the region of the friction lining or friction areas results in the form of heat which can be very high under certain operating circumstances. Such operating circumstances occur, for example, during mountain driving with trailers where a high power loss can result over a longer time and in changing from the unbridged to the bridged state of the converter clutch where owing to the times of high slippage in a short interval of time, a very high power loss or amount of heat can arise.

Therefore, hydrodynamic torque converters for the automatic transmission of motor vehicles have already been proposed, where measures were taken to generate an oil flow reducing the thermal load of the converter bridging clutch. Thus EP 78651 describes a flow converter with a bridging clutch in which channels are provided on the side of the rotary piston facing away from the friction lining or the friction area, which are connected through openings with the first chamber formed axially between a radial partition of the housing and the rotary piston, on one hand, and with the second chamber accommodating the turbine wheel and the pump impeller, on the other. Oil flows through the channels from the second chamber into the first chamber which serves to cool the viscous coupling formed in the torque flow between the rotary piston and the turbine hub.

The oil flow generated in this connection nonetheless rises due to the fact that the torque which can be transmitted by the bridging clutch is diminished as a consequence of dynamic or kinetic processes occurring in the oil flow. The torque transmission capacity of the bridging clutch moreover diminishes with increasing rotational speed as well as with rising volume flow.

A further disadvantage can be seen by the fact that the oil flow is dependent upon temperature, and therewith on the viscosity of the oil, as well as on the pressure difference between the pressures existing on both sides of the converter piston.

Hydrodynamic torque converters with bridging clutches have already been proposed in which the friction linings are provided with grooves for conducting oil and cooling. EP 0 428 248 describes a hydrodynamic converter whose converter bridging clutch has an annular friction lining in which channels are provided to permit the oil from the pressure chamber to flow over the annular friction lining and, in this way, to remove heat from the friction lining if this continuously runs during slippage on the stationary cover.

DE A 44 20 959 describes a hydrodynamic flow converter with a converter bridging clutch, whereby channels are provided in the radial region of the friction areas in at least one of the subassemblies, supporting or forming the friction areas, which in an axial position of the friction areas enable an oil flow from the one pressure chamber through the channels radially to the axis of rotation of the flow converter. The linear dimensioning and the shape of these channels or stampings moreover must take place such that the flow resistance arising is extended to the critical performance of the torque converter or the converter bridging clutch. This means that even at the maximum oil temperature possible, only so much oil may run off from the second chamber into the first chamber that the systemic pressure in the torque converter does not collapse.

Common to the two latter solutions is that the channels or grooves produce a direct hydraulic connection between the two pressure chambers in one of the friction linings. Whereby large tolerances in the channel depth arise according to the manufacturing process and this leads to a strong dependency of the oil flow through the depth of the channels. Furthermore, these channels frequently wear out so that a major provisioning of the channels must take place, owing to which the wet-running clutch accommodates an excessively high volume flow in the new state which a typical motor vehicle transmission cannot deliver.

Furthermore, channels constructed as blind grooves without through flow are known which, nevertheless, do not enable any cooling of the lining.

Furthermore, brake disks and clutches have become known which have depressions for self-induced cooling by air or oil, but these do not seal off the outer edge radially against the radially inner edge so that compression cannot take place by means of the coolant fluid.

Channels constructed as grooves in this manner could only be used with very expensive three channel converters whereby in these cases, the coolant oil, however, is not, at the same time, a pressure oil.

The object of the present invention is to create a wet slipping friction connection, especially for the converter bridging clutch of a hydrodynamic torque converter, whereby a cooling oil flow rising with the slippage rotational speed guarantees a sufficient cooling independently of the surface pressure of the bearing surfaces, and which is simple in construction and cheap to manufacture.

SUMMARY OF THE INVENTION

The invention, therefore, provides a slipping friction clutch which contains at least one pair of friction areas running in oil, whereby the pair of friction areas can be pressed against each other through an oil pressure difference hydraulically controlled from outside on a pressure piston under a differential rotation speed such that this differential rotational speed can be diminished over a specified period of time by the friction clutch, or can also be continuously regulated in a stationary manner. For this purpose, in the state acted upon by pressure, the friction area pair seals off the high pressure chamber, which lies radially outward, against the low pressure chamber, which again lies radially inward, whereby oil-conducting depressions are created in a friction area, which stands in direct hydraulic connection with the radially inward lying low pressure chamber. The depressions form channels which begin at the radially inside pressure chamber and which lead back, peripherally offset, to the same interior pressure chamber. These depressions have a course such that, during slippage of the clutch, the dragging action of the friction area sliding past in the peripheral direction along the depressions. That is, the channels have a component along the depressions so that an oil flow through, which rises with the slippage rotational speed, is induced and then cools the friction area.

Advantageously, cooler oil flows through one or more openings in the pressure piston, out of the high pressure chamber into the low oil pressure chamber lying inside the friction area pair, such that it flows directly into the region of the inlets and outlets of the depressions where it is mixed with the hot oil and is pumped through the depressions through the drag effect mentioned.

The friction clutch, according to the invention, offers the advantage of a slippage-dependent friction area cooling adapted to needs as it is especially necessary for converter bridging clutches. The oil flow through the converter is moreover adjustable independently of the depressions constructed as cooling grooves, for example, through baffles. The diminished oil flow through in the new state in comparison with the usual short circuit grooves with their provision on the basis of wear and tear and tolerances leads to the transmission having to furnish less oil. No counter pressure build up takes place in the grooves and therewith no diminution in the transmission capacity. The friction clutch can be simply and cheaply manufactured without narrow tolerance requirements. The friction clutch offers a neutral behavior in relation to push and pull whereby the grooves for reducing the drag factor, during pressure reversal, act as blind grooves which bring about a tug between friction lining and friction area which acts as a lifting off pressure.

BRIEF DESCRIPTION OF THE DRAWINGS

The invention will now be described, by way of example, with reference to the accompanying drawings in which.

DETAILED DESCRIPTION OF THE INVENTION

Figure 1:
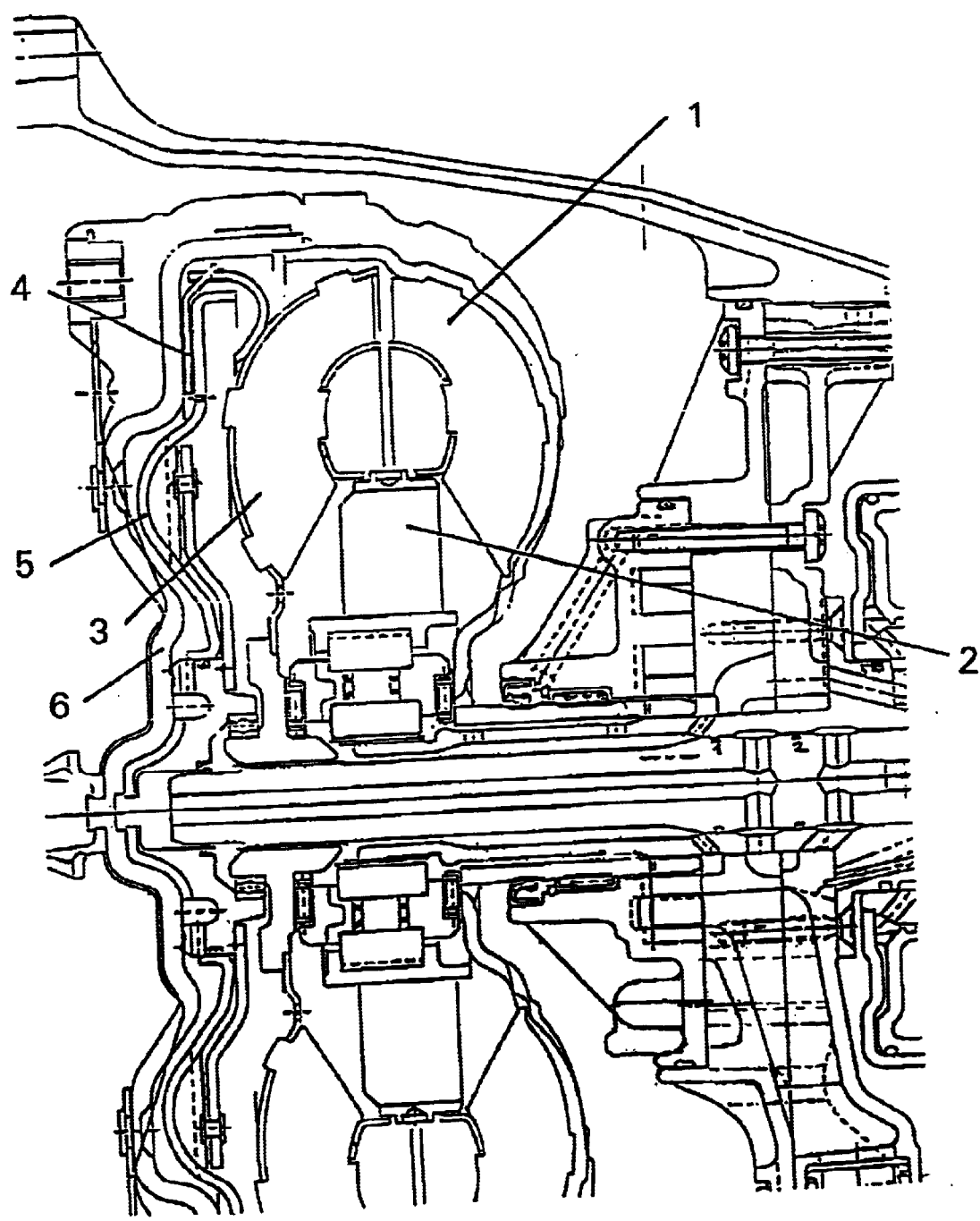
FIG. 1 schematically represents a section through a hydrodynamic torque converter with a converter bridging clutch.

Since hydrodynamic converters for automatic transmissions of motor vehicles are well known to the specialists, only the most important parts are provided with reference numbers in the schematically represented section of FIG. 1. Hence 1 is the pump impeller, 2 the guide wheel and 3 the turbine wheel which are arranged in a housing 6. A converter bridging clutch 4 is provided in the usual manner within the housing 6, whereby one of the friction areas is connected with an adjustable piston. 5. In the usual manner, the bridging clutch is arranged effectively parallel to the torque converter.

In order to be able to operate this converter bridging clutch with slippage over a large portion of the operating range of the hydrodynamic converter, whereby during the slippage phases in the friction engagement region of the converter bridging clutch, a power loss results in the form of heat which is too high for the specified operating conditions and can lead to a destruction, at least of the friction lining surface, as well as of a part of the oil present in the interior. It is now provided in accordance with the invention (as shown in the plan view in FIG. 2) that at least one of the friction linings 7 is provided with depressions 8, 8' in the form of channels or grooves introduced into the friction lining which stand in direct hydraulic connection to the radially inward lying low pressure chamber. The beginning and end of each groove 8, 8' is connected with the same pressure chamber, that is, in the represented design with the radially inward lying low pressure chamber, whereby the beginning and end of each groove 8, 8' have a specified distance from one another. Since the beginning and end of each groove opens in the same pressure chamber, the radially outward lying high pressure chamber is sealed off against the inward lying low pressure chamber in the state acted upon by pressure. When the friction clutch slips, a drag action of the friction area sliding by along grooves 8, 8' generates a component in the longitudinal direction of the grooves so that a rising oil flow through is induced with the slippage rotational speed which cools the friction area.

Figure 2:
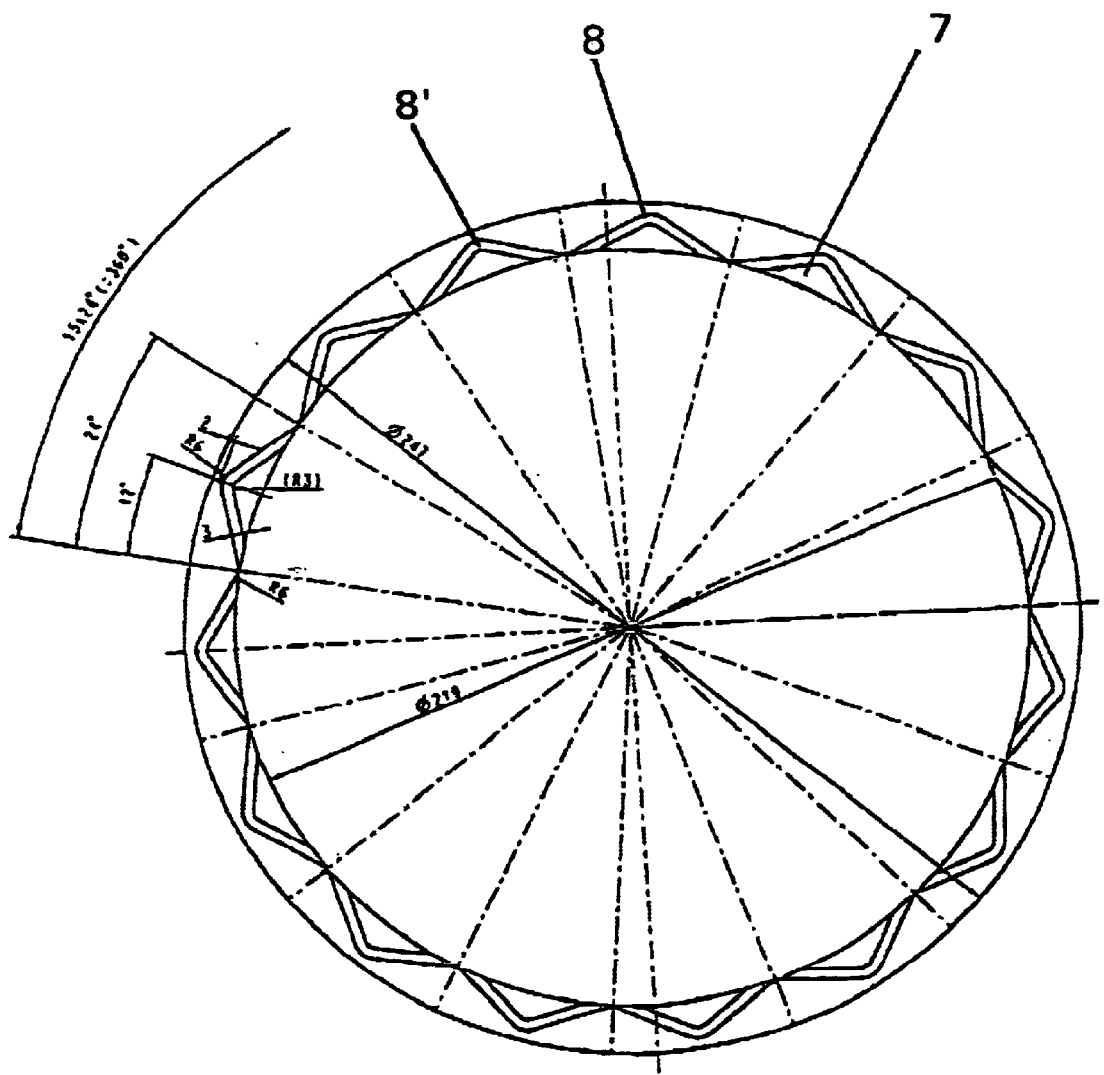
FIG. 2 shows a top view of a friction lining with depressions configured in accordance with the invention.
Figure 3:
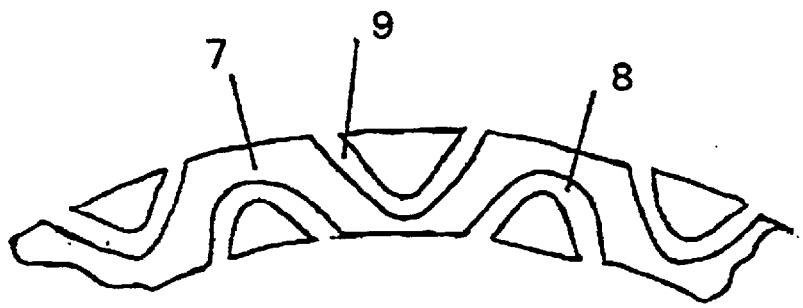
FIGS. 3 to 8 depicts various forms of the depressions in the friction linings according to the invention.

The section from a friction lining 7 in FIG. 3 here reveals that, first of all, depressions are provided in the form of grooves 8 which, as in the design represented in FIG. 2, are connected with the radially inward lying low pressure chamber while, at the same time, grooves 9 are provided in the regions between these grooves 8 whose beginning and end have a specified distance from one another and open in the radially outward lying high pressure chamber. Here as well, a sealing takes place through the friction area pair in conditions with pressure action, as none of the grooves 8, 9 produces a connection from the radially inward lying pressure chamber to the radially outward pressure chamber. An oil exchange takes place in the radially outward lying high pressure chamber, on one hand, and in the radially inward lying low pressure chamber, on the other hand.

Figure 4:
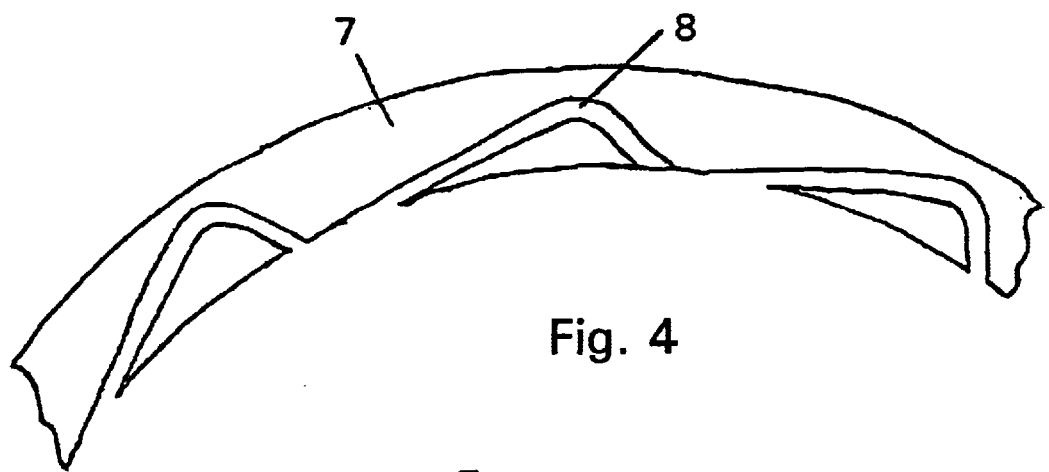

With the design example represented in FIG. 4, a section of an annular friction area is again represented by a 7, whereby the shape of the depressions 8 here is configured to promote flow such that the inlet of the grooves 8 generates a blading effect so that even more oil is pumped into the grooves 8.

Figure 5:
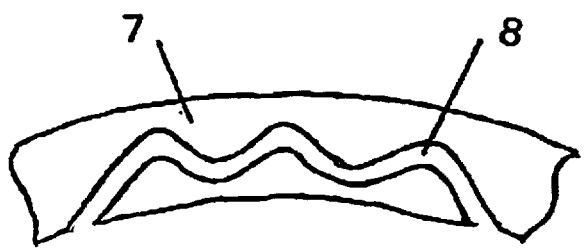

FIG. 5 illustrates a groove 8 in a friction lining which is configured wave-like between the beginning and the end and moreover has deflections.

Figure 6:
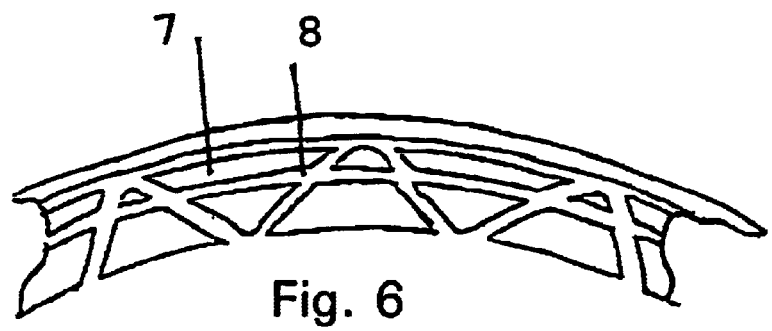

FIG. 6 shows a design of a branched groove 8 in a friction lining 7 where as large as possible proportion of the friction lining is cooled by the drag action of oil carried along into the grooves 8.

Figure 7:
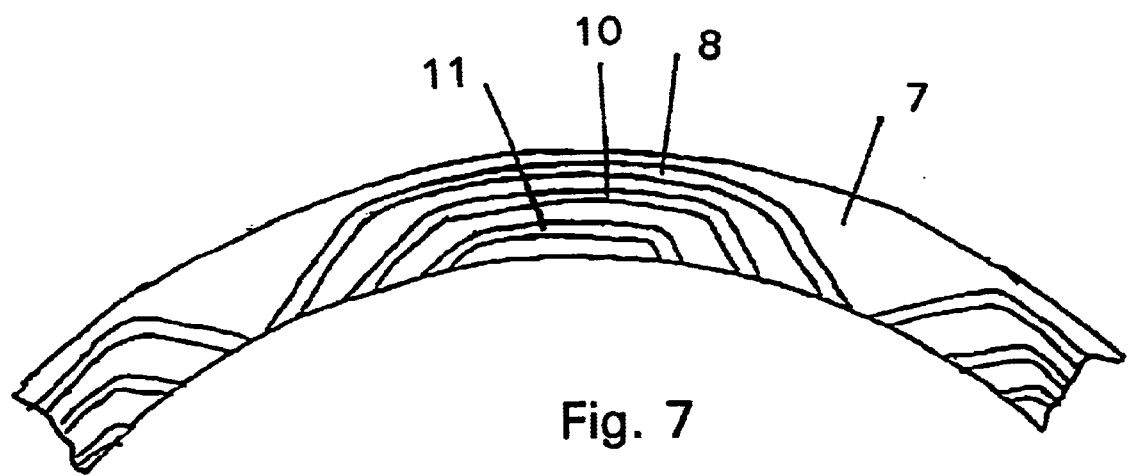

With the design represented in FIG. 7, several grooves 8, 10, 11 positioned one over the other, but not standing in direct connection with one another, are provided in the friction lining 7.

Figure 8:
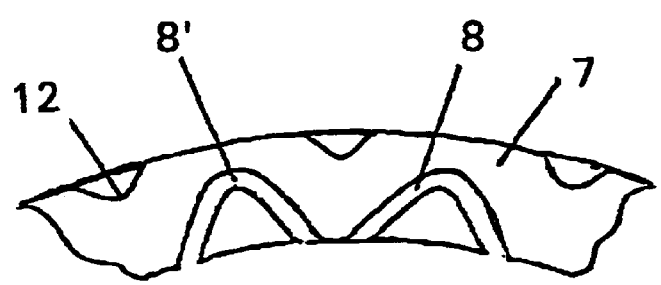

FIG. 8 shows hook-like grooves 8, 8' which are connected with the radially inward lying low pressure chamber as well as notches 12 on the exterior of the annular friction area 7 owing to which the friction lining surface facing the radially outward lying high pressure chamber is enlarged.

It is also essential, as the figures reveal, that the depressions provided in accordance with the invention begin in the form of grooves or channels in one pressure chamber and, offset peripherally, once again lead back into the same pressure chamber, whereby these channels or grooves have a course such that, with the clutch slipping, the drag action of the friction area passing peripherally along the grooves or channels forms a component in their longitudinal direction so that an oil through flow rising with the slippage rotational speed is induced in them which cools the friction area.

With an advantageous design not represented in the drawings, cooler oil flows through one or more openings in pressure piston 5 of FIG. 1 out of the high pressure chamber into the low pressure chamber inside the friction area pair and indeed directly into the region of the inlets and outlets of the grooves or channels, where it is mixed with hotter oil and is pumped, by the drag effect mentioned above, through the grooves or channels.

It is especially beneficial if the openings in pressure cylinder 5 are baffles, since these have the advantage of a very low tolerance. One to two baffles have proven to be especially advantageous, the arrangement of which takes place about 0 to 5 mm radially inside the lining edge.

The grooves and channels can also be provided outside in the friction lining in steel or also, however, in both friction areas.

A friction area pair can consist of the friction lining of a friction lamella which can bear with the friction lining unilaterally or bilaterally and have a matching friction area with or without friction lining.

In another possible design, the lining is installed on the converter cover while the grooves or channels are provided in the piston. To the extent that the depressions are produced as cut outs or stamped in grooves, it is advantageous if their depth amounts to more than 0.5 mm.

The radial extension of the grooves can take place up to 1 . . . 5 mm on the radially outer lining edge.

Preferably the groove portion in the friction lining surface is from 20 to 30%.

The forming of the grooves can be conducted according to standards, for example, with continuously identical radius and without a change in cross section with a constant groove dimension over the entire length of the groove and/or with a variable groove width over the length of the groove. The grooves can be constructed symmetrically with relation to an inlet and an outlet into the pressure chamber or, however, also asymmetrically in relation thereto. As needed, the grooves can have one or more deflections, whereby especially the inlet of the grooves can be configured that a blading action, such as is represented in FIG. 4, arises through which more oil is pumped into the grooves.

Reference Numbers
1 Pump impeller
2 Guide wheel
3 Turbine wheel
4 Clutch
5 Piston
6 Housing
7 Friction lining
8 Groove
9 Groove
10 Groove
11 Groove
12 Notch

What is claimed is:

1. A slippable frictional clutch for a converter bridging clutch of a hydrodynamic torque converter of a motor vehicle automatic transmission, the slippable frictional clutch comprising;
   at least a first wet-running friction lining for rotation at a first rotational speed and a second wet-running friction lining for rotation at a second rotational speed;
   a pressure piston for forcing the first and second friction linings toward one another as a function of an external hydraulic differential oil pressure, and as the first and second friction linings are move toward one another, any speed difference between the first and second friction linings is one of reduced and eliminated;
   when first and second friction linings move toward one another by pressure from the pressure piston, a radially outward high pressure chamber being sealed with respect to a radially inward low pressure chamber;
   at least one of the first and second friction linings has a plurality of oil-conducting depressions therein, the plurality of oil-conducting depressions each have a single inlet spaced from a single outlet, and the single inlet and the single outlet of each of the plurality of oil-conducting depressions being connected only with one of the radially outward high pressure chamber and the radially inward low pressure chamber;
   the oil-conducting depressions are configured such that when the first friction lining slips with respect to the second friction lining, the plurality of oil-conducting depressions exert a drag effect and induce oil flow through the plurality of oil-conducting depressions to facilitate cooling of the first and second friction linings, and
   the plurality of oil-conducting depressions amount to between 20 to 30% of the surface of the friction lining.

2. The slippable frictional clutch according to claim 1, wherein the plurality of oil-conducting depression are grooves formed in at least one of the first and second friction linings.

3. The slippable frictional clutch according to claim 1, wherein the plurality of oil-conducting depressions are grooves formed in both of the first and second friction linings.

4. The slippable frictional clutch according to claim 1, wherein the plurality of oil-conducting depressions are one of cut outs and stamped grooves which have a depth greater than 0.5 mm.

5. The slippable frictional clutch according to claim 1, wherein an extension of the plurality of oil-conducting depressions extends from a radially outer lining edge by a distance of from 1 to 5 mm.

6. The slippable frictional clutch according to claim 1, wherein the plurality of oil-conducting depressions comprise radially outward grooves and radially inward grooves, the radially outward grooves are arranged in at least one of the first and second friction linings so that oil exchange, in the radially outward high pressure chamber, only takes place via the radially outward grooves and the radially inward grooves are arranged in at least one of the first and second friction linings so that oil exchange, in the radially inward low pressure chamber, only takes place via the radially inward grooves.

7. The slippable frictional clutch according to claim 1, wherein each of the plurality of oil-conducting depressions has a uniform radius without any change in a cross section of the depression.

8. The slippable frictional clutch according to claim 1, wherein each of the plurality of oil-conducting depressions has a width which is constant over a length of each depression.

9. The slippable frictional clutch according to claim 1, wherein each of the plurality of oil-conducting depressions has a width which is variable over a length of each depression.

10. The slippable frictional clutch according to claim 1, wherein the plurality of oil-conducting depressions are each arranged symmetrically in relation to the inlets and outlets.

11. The slippable frictional clutch according to claim 1, wherein the plurality of oil-conducting depressions are arranged asymmetrical in relation to the inlet and outlets.

12. The slippable frictional clutch according to claim 1, wherein at least one of the plurality of oil-conducting depressions branches away and again joins together.

13. The slippable frictional clutch according to claim 1, wherein at least one of the plurality of oil-conducting depressions has at least one deflection therein.

14. The slippable frictional clutch according to claim 1, wherein the input of each of the plurality oil-conducting depressions in at least one of the first and second friction linings is configured such that a blading action occurs, during operation of the slippable frictional clutch, to increase an amount of oil pumped by the frictional clutch.

15. The slippable frictional clutch according to claim 1, wherein in a vicinity of the inlet and outlets of the plurality of oil-conducting depressions, of at least one of the first and second friction linings, additional outlets are provided which are connected with at least one opening of the pressure piston of the hydrodynamic converter so that the cooling oil flowing from the radially outward higher pressure chamber into the radially inward lower pressure chamber reaches regions of the inlets and the outlets of the plurality of oil-conducting depressions.

16. The slippable frictional clutch according to claim 15, wherein the at least one opening in the pressure piston is a baffle.

17. The slippable frictional clutch according to claim 16, wherein the baffle is arranged in the pressure cylinder, and the baffle is provided between 0 and 5 mm radially inside an edge of one of the first and second frictional linings.

18. The slippable frictional clutch according to claim 1, wherein the first and second friction linings each comprise a friction lamella which can bear the first and second friction linings unilaterally or bilaterally and the first and second friction linings further comprise a matching friction area without a further friction lining.

19. The slippable frictional clutch according to claim 17, wherein the first and second friction linings each comprise of a friction lamella which can bear the first and second friction linings unilaterally or bilaterally and the first and second friction linings further comprise a matching friction area without a further friction lining.

20. A slippable frictional clutch for a converter bridging clutch of a hydrodynamic torque converter, the slippable frictional clutch comprising;
- a rotatable first friction lining and a rotatable second friction lining;
- a pressure piston for forcing, by a hydraulic pressure differential, the first and second friction linings into engagement with one another and, as the first and second friction linings engage one another, any speed differential between the first and second friction linings is one of reduced and eliminated;
- upon engagement of the first and second friction linings with one another, the engaged first and second friction linings sealing a radially outward high pressure chamber from a radially inward low pressure chamber;
- at least one of the first and second friction linings has a plurality of oil-conducting depressions therein, the plurality of oil-conducting depressions each have a single inlet spaced from a single outlet, and the single inlet and the single outlet of each of the plurality of oil-conducting depressions being connected only with one of the radially outward high pressure chamber and the radially inward low pressure chamber;
- the oil-conducting depressions are configured such that when slip occurs between the first and second friction linings, the plurality of oil-conducting depressions exert a drag effect and induce oil flow through the plurality of oil-conducting depressions to facilitate cooling of the first and second friction linings, and
- the plurality of oil-conducting depressions amount to between 20 to 30% of the surface of at least one of the first and the second friction linings.

* * * * *